(12) United States Patent
Marfia et al.

(10) Patent No.: US 11,290,500 B2
(45) Date of Patent: Mar. 29, 2022

(54) METHOD AND DEVICE FOR CORRELATING IN A LAWFUL INTERCEPT MEDIATION SYSTEM

(71) Applicant: Telefonaktiebolaget LM Ericsson (publ), Stockholm (SE)

(72) Inventors: Francesca Marfia, Pagani (IT); Francesco Toro, Baronissi (IT); Vincenzo Cuniato, Acerra (IT); Dario De Vito, Mercato San Severino (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 74 days.

(21) Appl. No.: 16/978,572

(22) PCT Filed: Mar. 7, 2018

(86) PCT No.: PCT/SE2018/050214
§ 371 (c)(1),
(2) Date: Sep. 4, 2020

(87) PCT Pub. No.: WO2019/172810
PCT Pub. Date: Sep. 12, 2019

(65) Prior Publication Data
US 2021/0021645 A1    Jan. 21, 2021

(51) Int. Cl.
*G06F 15/16* (2006.01)
*H04L 29/06* (2006.01)
*H04L 67/146* (2022.01)

(52) U.S. Cl.
CPC ........ *H04L 63/306* (2013.01); *H04L 63/0892* (2013.01); *H04L 67/146* (2013.01)

(58) Field of Classification Search
CPC .. H04L 63/306; H04L 63/0892; H04L 67/146
USPC .......................................................... 709/224
See application file for complete search history.

(56) References Cited

U.S. PATENT DOCUMENTS

| | | | |
|---|---|---|---|
| 7,903,719 B2 * | 3/2011 | Genghi | H04B 1/7077 375/140 |
| 8,726,118 B2 * | 5/2014 | Tanigawa | H04L 1/08 714/748 |
| 2003/0101356 A1 | 5/2003 | Miettinen et al. | |
| 2007/0183487 A1 * | 8/2007 | Genghi | H04B 1/7077 375/150 |

(Continued)

FOREIGN PATENT DOCUMENTS

| WO | 01 19036 A1 | 3/2001 |
|---|---|---|
| WO | 2017 032425 A1 | 3/2017 |

OTHER PUBLICATIONS

ETSI TR 102 528 v1.1.1; Technical Report; Lawful Interception (LI); Interception domain Architecture for IP networks—Oct. 2006.

(Continued)

*Primary Examiner* — Moustafa M Meky
(74) *Attorney, Agent, or Firm* — Baker Botts, LLP (57) ABSTRACT

This disclosure relates to a method S100 and a device for correlating in a Lawful Intercept Mediation system, LIMS, received Intercept Related Information, IRI, and, Communications Content, CC, data packets of a 5 targets lawfully intercepted session for deliverance over HI2 and HI3 interfaces, respectively, by means of a session-specific Correlation Identification Number, CIN.

13 Claims, 6 Drawing Sheets

(56) References Cited

U.S. PATENT DOCUMENTS

| | | | |
|---|---|---|---|
| 2009/0271680 A1* | 10/2009 | Tanigawa | H04L 1/1854 |
| | | | 714/748 |
| 2013/0132786 A1* | 5/2013 | Tanigawa | H04L 1/08 |
| | | | 714/749 |
| 2020/0222756 A1* | 7/2020 | Sano | A61B 5/4088 |

OTHER PUBLICATIONS

ETSI TS 102 232-3 v3.6.1; Technical Specification; Lawful Interception (LI); Handover Interface and Service-Specific Details (SSD) for IP delivery; Part 3: Service-specific details for internet access services—Aug. 2017.

ETSI TS 102 234 v1.6.1; Technical Specification; Lawful Interception (LI); Service-Specific details for internet access services (due to size, this has been split into four parts)—Jul. 2006.

3GPP TSG-SA WG3-Li Meeting #58; Singapore; Change Request; Title: New events related to some messages to and from HSS/HLR; Source to WG: SA3-LI (Ministry in charge of electronic communications (France)); Source to TSG: SA3 (S3i150220)—Jul. 14-16, 2015.

PCT International Search Report issued for International application No. PCT/SE2018/050214—dated Nov. 29, 2018.

PCT Written Opinion of the International Searching Authority issued for International application No. PCT/SE2018/050214—dated Nov. 29, 2018.

Examination Report issued for Intellectual Property India for Application No. 202017041439—dated Aug. 10, 2021.

* cited by examiner

METHOD AND DEVICE FOR CORRELATING IN A LAWFUL INTERCEPT MEDIATION SYSTEM

PRIORITY

This nonprovisional application is a U.S. National Stage Filing under 35 U.S.C. § 371 of International Patent Application Serial No. PCT/SE2018/050214 filed Mar. 7, 2018 and entitled "Method and Device for Correlating in a Lawful Intercept Mediation System" which is hereby incorporated by reference in its entirety.

TECHNICAL FIELD

The present technology relates to Lawful Interception (LI). More particular, it relates to a method and a system for correlating Intercept Related Information and Content Communication of a target.

BACKGROUND

Figure 1:
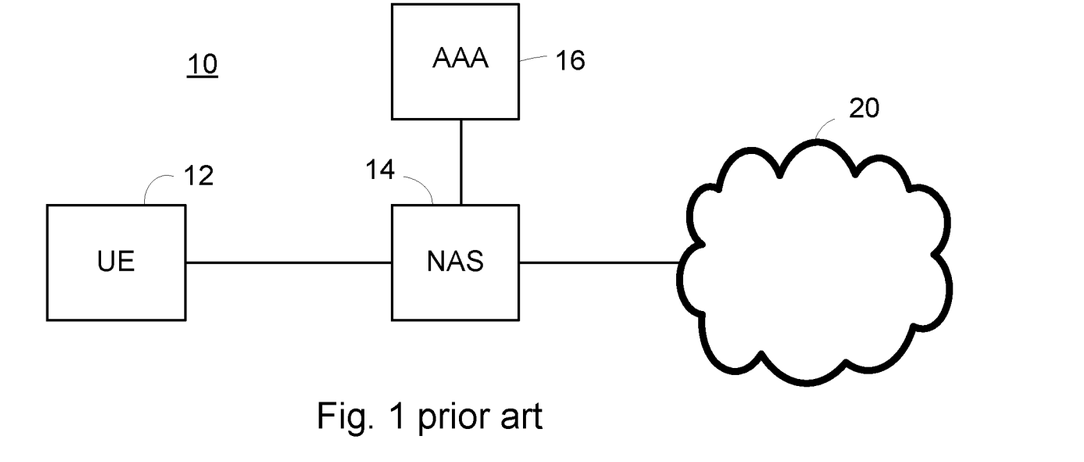
FIG. 1 is a block diagram of an exemplary network in which devices and methods described herein may be implemented.

FIG. 1 is schematically illustrating in a fixed broadband system comprising a Network Access 10. In this scenario, the most important network elements that also take part to the lawful interception are:
- a RADIUS server 16 that is used by Internet Service Providers (ISPs) and enterprises to manage access to the Internet 20 or internal networks, wireless networks, and integrated e-mail service. It performs the Authentication, Authorization and Accounting functions thanks to the AAA protocol.
- a Network Access Server, NAS, 14 being the entry point of the access network 10 for a user equipment, UE, 12.

When a user needs to use the internet 20, the user dials-in a NAS server 14 run by the Internet Service Provider (ISP). Before granting access to Internet, the NAS 14 authenticates the user via a RADIUS server 16. When a user and the user's UE 12 is authenticated and authorized, the NAS 14 will assign an IP address to him.

Figure 2:
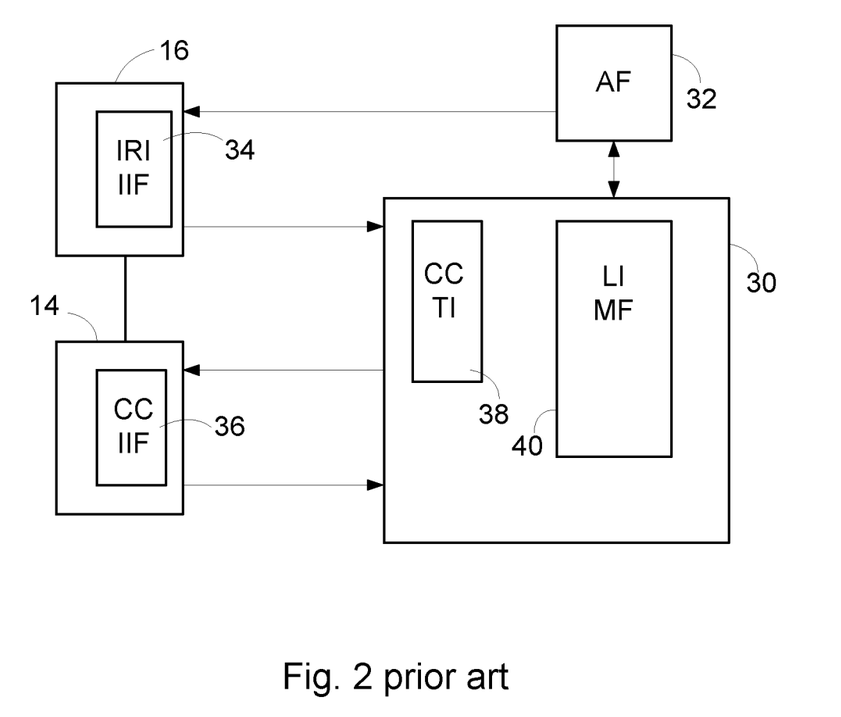
FIG. 2 is a block diagram illustrating a reference model of a system for Lawful Interception.

FIG. 2 is illustrating a reference model of a system for Lawful Interception.

The standard ETSI TS 102 528 defines the reference model for the interception of the data services.

An Intercept Mediation and Delivery Unit, IMDU, 30 comprises a LI Mediation Function, LIMF, 40, connected to an Administration Function, AF, 32. Said Mediation Function 40 and Administration Function generate based on said received request a warrant comprising said one or more target identities, and sends said warrant towards an Intercepting Access Point, IAP, via an interface denoted X1_1. The IAPs are nodes of a network. In the illustrated example, an Intercept Related Information Internal Interception Function, IRI-IIF, 34 is placed in and connected to a server performing authentication, authorization, and accounting services 16, e.g. a Radius server. A Content Communications Internal Intercept Function, CC-IIF, 36 is placed in and connected to a NAS server 14.

According to the Technical Standard of ETSI TS 102 528, the Content Communication Trigger Function, CCTF, 38 is collocated with the LIMF 40. Said CC and IRI are network related data. an Intercept Related Information Internal Interception Function, IRI-IIF, 34 is placed in and connected to a server performing authentication, authorization, and accounting services 16, e.g. a Radius server. A Content Communications Internal Intercept Function, CC-IIF, 36 is placed in and connected to a NAS server 14.

Figure 3:
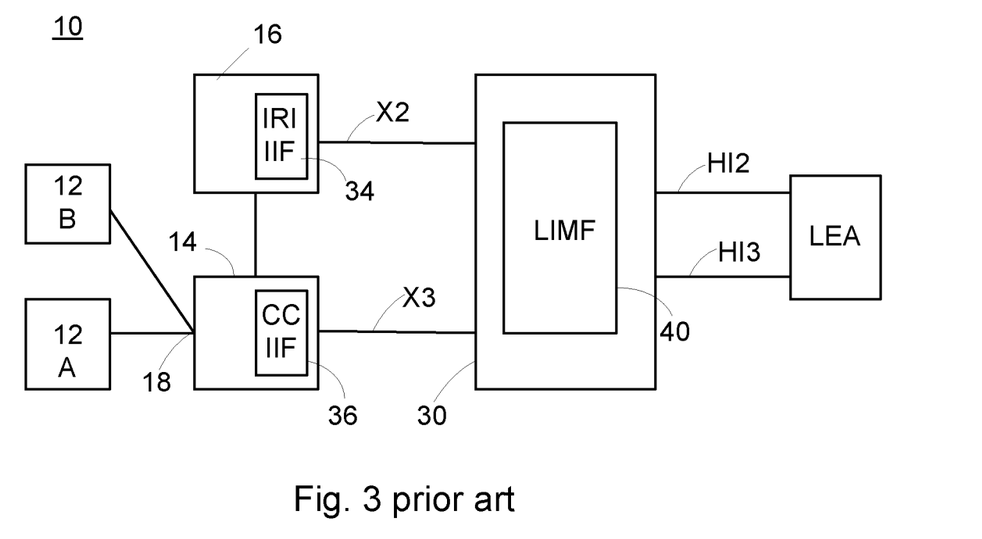
FIG. 3 is a block diagram showing the LI of a fixed broadband scenario when the target is NAS-dependent.

FIG. 3 schematically illustrates a fixed broadband network access system comprising a system for Lawful Interception.

The illustrated system is based on the reference model in FIG. 2.

The LI system shall provide access to the intercepted Content Communications, CC, and Intercept Related Information, IRI, of a target and services related to the target on behalf of one or more Law Enforcement Agencies, LEAs. The IRI-IIF, 34 sends IRI raw data via an interface X2 to a Mediation Function of IRI and Delivery Function for IRI reporting of the LIMF 40 of an IMDU 30 that generates and delivers to a collection functionality a standardized IRI report based on the received IRI report. Said standardized IRI report is sent over a standardized interface HI2 to the LEA. The CC-IIF sends CC raw data via an interface X3 to a Mediation Function and Delivery Function for CC reporting of the LIMF 40 of an IMDU 30 that generates and delivers to a collection functionality a standardized CC report based on the received CC report. Said standardized CC report is sent over a standardized interface HI3 to the requesting LEA.

The HI2 and HI3-interfaces represent the interfaces between the LEA and two delivery functions. The delivery functions are used:
- to distribute the Intercept Related Information (IRI) to the relevant LEA(s) via HI2;
- to distribute the Content of Communication (CC) to the relevant LEA(s) via HI3.

Some NAS 14 cannot be flooded with a huge number of LI commands (activation/deactivation of target interception) because these could interfere with non-LI NAS activities. In addition the traffic mirroring is an heavy operation for the NAS device that may influence its performance. For this reason the nature of the identity to be used as target type is very important.

NAS-dependent target identities are preferred by Network Operators because they allow to intercept many user sessions at once with just one warrant.

To meet customer needs when using NAS-dependent target identity, the warrant activation command has to be sent only once to the NAS and not for every Acct-Request-Start message as described in ETSI TS 102 528.

The problem with the existing solution is that the NAS-dependent target identities are not the best solution for LEA (LEgal Agencies). In fact, in the intercepted user plane, X3 i/f (X3 interface), it is not possible to distinguish among different user sessions due to the intrinsic not-session based nature of the target and to the fact some vendors don't provide the session identification means on their X3 interface.

FIG. 3 shows the LI of a fixed broadband scenario when the target is NAS-dependent (e.g. NAS-PORT_ID) at prior art. User1 12A and User2 12B are sharing the same internet access via the same NAS-Port-ID 18 and are making different sessions. At prior art, it is not possible to distinguish among different user sessions. At prior art, a unique session identification is provided to LEA that is target based, and it is not possible to real-time isolate each single user session.

Consequently, the Mediation Function is not able to provide such information on HI3 and on the LEA side there's no possibility to real-time follow and re-build the different intercepted user sessions.

In addition the ETSI TS 102 232-3 doesn't cover this particular scenario of NAS-dependent target identities combined with the definition of user session.

SUMMARY

One object of the following disclosure is therefore to propose a solution of the problem to distinguish among different user sessions.

According to one aspect of the proposed solution, a method and embodiments thereof are provided. It is a method for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a specific Correlation Identification Number, CIN. The method comprises the steps of receiving an accounting server message of a first kind or a second kind, acquiring identification and address information from the received message. If the accounting server message is of the first kind, the method continuous by creating a session-specific CIN using said acquired identification, a session ID and address information.

According to another aspect of the proposed solution, a device and embodiments thereof are provided. It is a device for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a specific Correlation Identification Number, CIN. The device comprises a receiver configured to receive an accounting server message of a first kind or a second kind, a data extractor configured to acquire identification and address information from the received message identification and address information, a detector configured to detect which kind of the received accounting server message for determining whether a session-specific CIN should be stored in a dedicated data storage or removed from the dedicated data storage. The device further comprises a processor being configured to, if the accounting server message is of the first kind, create a session-specific CIN using said acquired identification, a session ID and address information.

One advantage is that the LEA is able to real-time follow and re-build the intercepted user sessions even in case of NAS-dependent target identities.

Another advantage is that ISP can continue use these types of targets without affecting NAS equipment performances during non-LI activities and adding values in LI information delivered to the LEA.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

This disclosure provides a method to be implemented in an LI Mediation System (LIMS) for detecting any particular intercepted user sessions in case of NAS-dependent target identities in a broadband scenario. It introduces an additional session-specific CIN, i.e. a CIN that is based on a target's ID and session identification to identify user sessions in case of NAS-dependent target identities.

Figure 4:
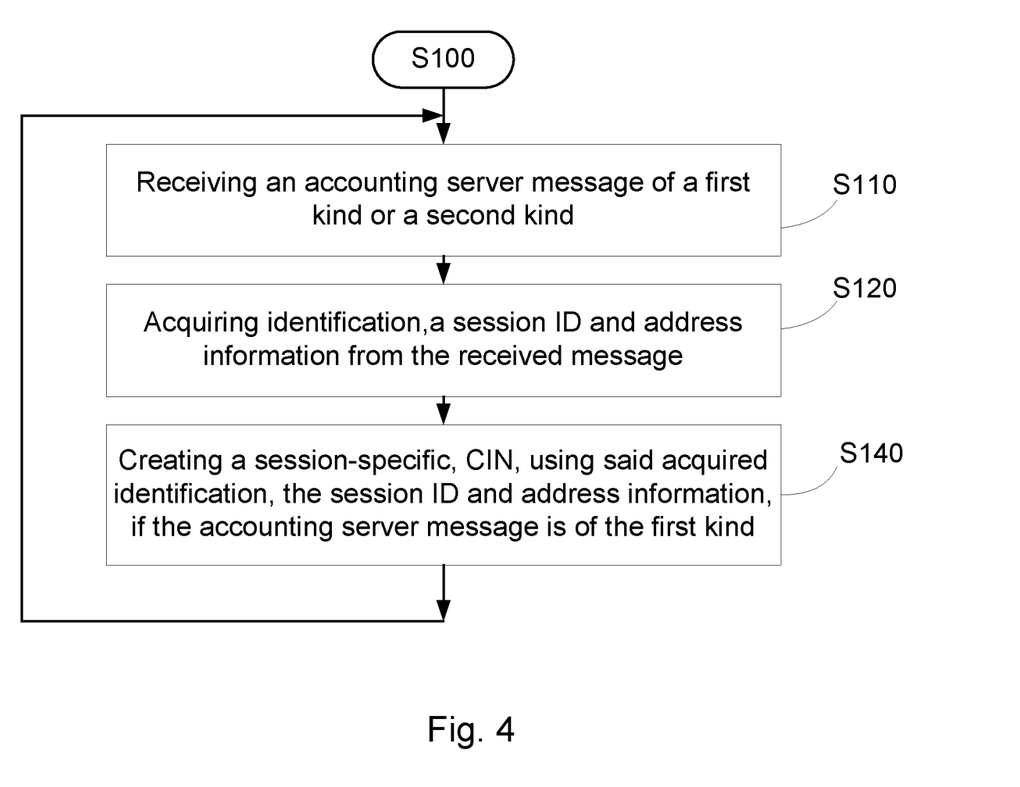
FIG. 4 is a flow chart illustrating a proposed correlation method for solving the stated problem.

FIG. 4 is a flow chart illustrating a correlation method for solving the problem stated in the background section of this disclosure.

The Framed IP-address information from IRI-IIF RADIUS messages and source/destination IP-address extracted from IP intercepted packets from CC-IIF are used by the mediation function MF to generate the additional session based CIN to be provided to the LEA over both HI2 and HI3 i/f.

The proposed solution enables to provide the LEA with one alternative level of correlation information to the existing one related to the intercepted target. The proposed solution enables correlation method based on each separate intercepted user sessions.

The flow chart in FIG. 4 comprises the steps of a method S100 for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a session-specific Correlation Identification Number, CIN. The method comprises the steps of:

S110: —Receiving an accounting server message of a first kind or a second kind. The method makes use of information contained in an accounting server message, e.g. a RADIUS messages coming from RADIUS servers, which is an accounting message. An accounting server message may be of a first kind, e.g. a start message or an interim update message, and the second kind may be a stop message.

S120: —Acquiring identification and address information from the received message. The read and acquired identification information from the received message is Target Identification Data, TID, and Acct-Sessions- IDentification, and the address information is the Frame-IP-Address, said Frame-IP-Address being associated to the target.

S140: —Creating a session-specific CIN using said acquired identification, a session ID and address information, if the accounting server message is of the first kind. When LIMS receives on X2 i/f a RADIUS accounting message it extracts the relevant information:

the target identity, TID;
the Framed-IP-Address (radius attribute 8)
Acct-Session-ID (radius attribute 44)
TID is the target identity used to set interception on IRI-IIF, i.e. the RADIUS server;
Framed-IP-Address is the dynamic IP address assigned to the user for each specific session;
Acct-Session-ID is the unique session identifier.
LIMS builds a session-specific CIN, to be introduced on both HI2 and HI3, as a function of the above three parameters. The session-specific CIN may be created by generating the CIN by means of a CIN generation function CIN=CinFunction(TID, Framed-IP-Address, Acct-Session-ID). Among all the possible target identities it is possible to find RADIUS attributes whose lifecycle is session-specific, e.g account-session-id— RADIUS attribute 44, and others that do not change among different sessions, e.g. NAS-Port-ID-RADIUS attribute 87, that is called NAS-dependent target identities.

Step 120 may also involve a step and test 130 and S135: —Detecting kind of the received accounting server message for determining whether a session-specific CIN should be stored in a dedicated data storage or removed from the dedicated data storage. If the received message is of the first kind, i.e. result of test in S135 is yes, a CIN should be created in S140 and stored in a dedicated data storage. If the accounting server message is of the second kind, i.e. a stop message, a CIN has already been created and stored, but not to be used again. The CIN should therefore be deleted in the storage.

Figure 5:
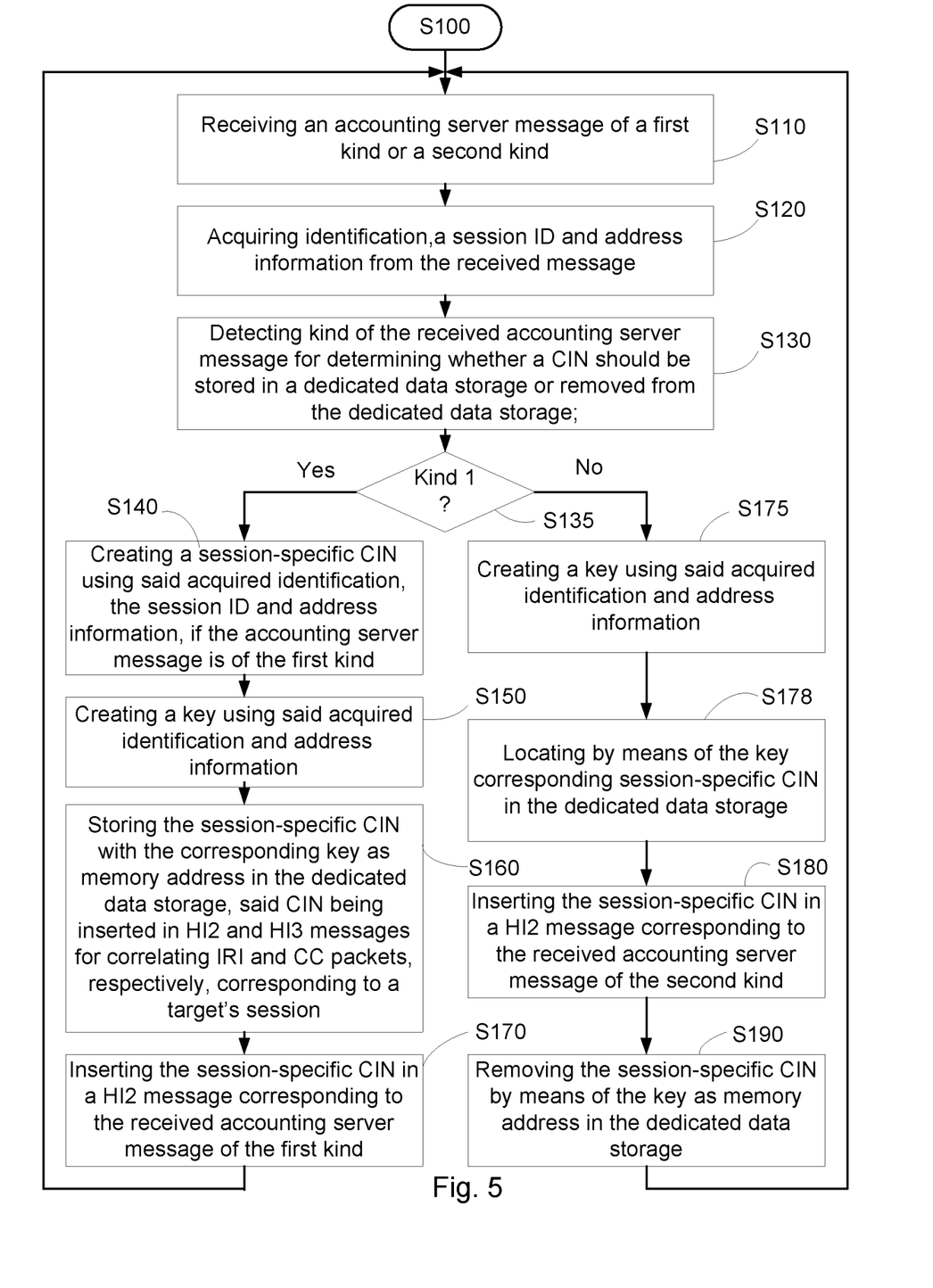
FIG. 5 is a flow chart illustrating an embodiment of the proposed correlation method for solving the stated problem.

FIG. 5 is a flow chart illustrating an embodiment of the correlation method for solving the problem stated in the background section of this disclosure.

This method comprises the steps of:

S110: —Receiving an accounting server message of a first kind or a second kind.

S120: —Acquiring identification, a session ID and address information from the received message.

S110 and S120 are described in the text above related to FIG. 4.

S130 and S135: —Detecting kind of the received accounting server message for determining whether a session-specific CIN should be stored in a dedicated data storage or removed from the dedicated data storage. If the received message is of the first kind, result of test in S135 is yes, a CIN should be created and stored in a dedicated data storage. If the accounting server message is of the second kind, i.e. a stop message, a CIN has already been created and stored, but not to be used again. The CIN should therefore be deleted in the storage.

Thus, if the accounting server message is of the first kind according to test S135:

S140: —Creating a session-specific CIN using said acquired identification, the session ID and address information, if the accounting server message is of the first kind.

S150: —Creating a key using said acquired identification and address information. The key may be created by generating the key by means of a key generation function Key=KeyFunction(TID, Framed-IP-Address). A cache memory map, CinCacheMap, is built creating a key as a function of TID, Framed-IP-Address and the related value of session based CIN. Any cache item is created/updated every time a new Radius Accounting Start or InterimUpdate message is received. Besides, when a RADIUS accounting Stop message is received the related cache item is removed.

S160: —Storing the session-specific CIN with the corresponding key as memory address in the dedicated data storage, said session-CIN being inserted in HI2 and HI3 messages for correlating IRI and CC packets, respectively, corresponding to a target's session.

The session-specific CIN is stored with the corresponding key as memory address in the dedicated data storage. The session-specific CIN is than used inserted in HI2 and HI3 messages for correlating IRI and CC packets S170: —Inserting the session-specific CIN in a HI2 message corresponding to the received accounting server message of the first kind. If the received accounting server message is of the first kind, e.g. a start message or an interim update message, the session-specific CIN is inserted in the HI2 message corresponding to the received accounting server message.

If the accounting server message is of the second kind, following steps are performed:

S175: —Creating a key using said acquired identification and address information. The key is created by generating the key by means of a key generation function Key=KeyFunction(TID, Framed-IP-Address) using the acquired target identification TID and Framed-IP-Address.

S178: —Locating by means of the key corresponding session-specific CIN in the dedicated data storage. The key is used as an address to the corresponding session-specific CIN stored in the dedicated data storage CinCacheMap.

S180: —Inserting the session-specific CIN in a HI2 message corresponding to the received accounting server message of the second kind. If the received accounting server message is of the second kind, i.e. in this case a stop message, the session-specific CIN is inserted in the HI2 message corresponding to the received accounting server message.

S190: —Removing the session-specific CIN by means of the key as memory address in the dedicated data storage. As a message of the second kind, i.e. in this case a stop message, said message indicates that the corresponding session is finished. The session-specific CIN and the corresponding key are removed from the dedicated data storage.

When LIMS receives the X3 packets from CC-IIF it reads the TID value contained into the X3 header and both the source and destination IP addresses inspecting the intercepted IP packet. Using the above KeyFunction, it builds the key using the TID and source address pair and search for a matching into a dedicated data storage, herein also denoted the CinCacheMap. If the matching is found the related session based CIN is set on HI3, otherwise the operation is repeated using the TID and destination address pair.

If no matching is found at all the related HI3 message is sent to the LEA without session based CIN information. That could happen if no RADIUS accounting message related to the given TID and Framed-IP-Address is received on X2 i/f prior of the related X3 intercepted packets.

Figure 6:
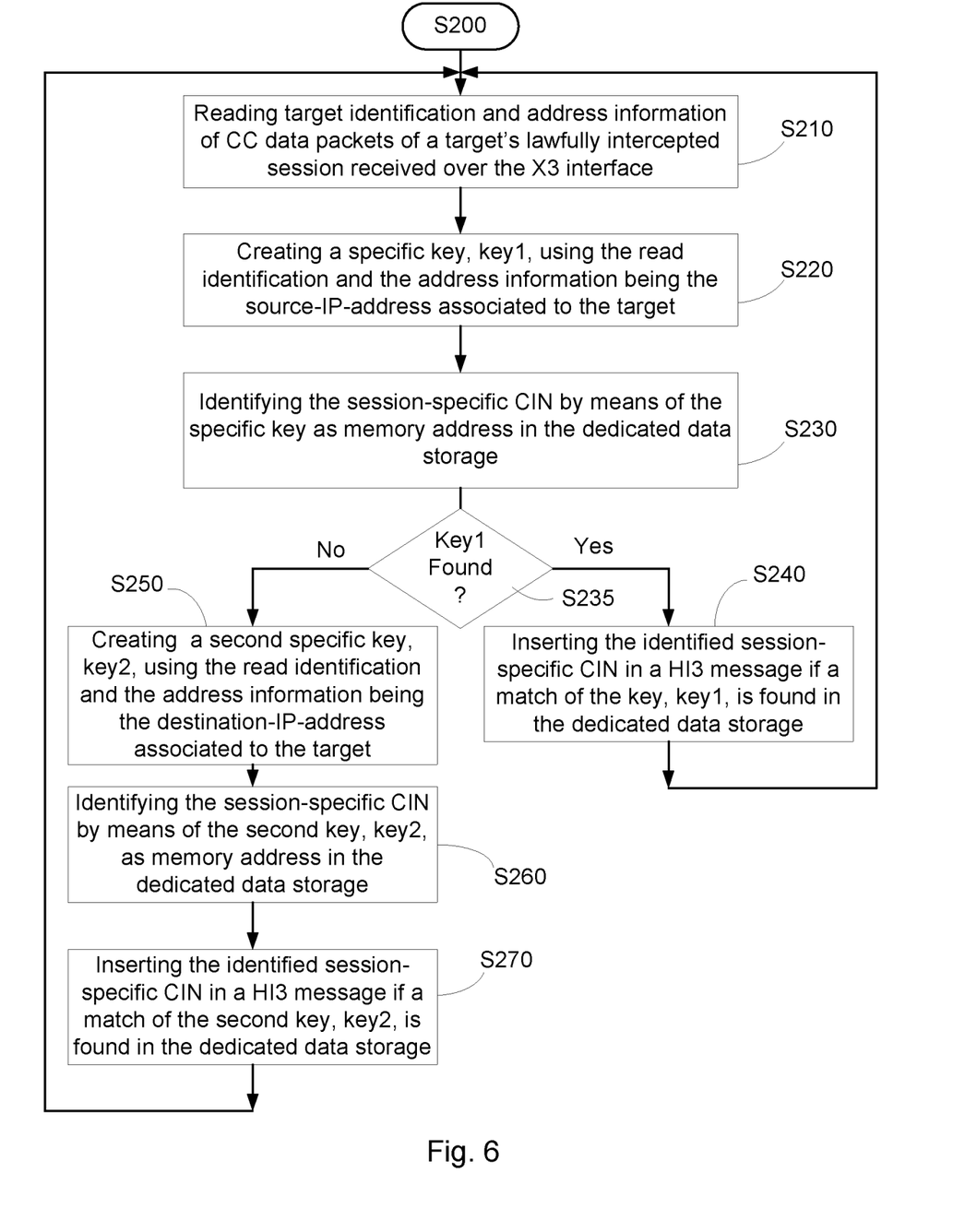
FIG. 6 is a flow chart illustrating a correlation method S200 using the session-specific CIN created in the method S100.

FIG. 6 is a flow chart illustrating a correlation method S200 using the session-specific CIN created in the method S100.

The method S100 is related to the method S200, as the method S100 provides the session-specific CIN which is used in the HI3 messages transferring the CC IP packets to the LEA. In method S200, CC packets of a target's lawfully intercepted session are received over an X3 interface. The method S200 comprises the steps of:

- S210: —Reading target identification and address information of CC data packets of a target's lawfully intercepted session received over the X3 interface. When a session of a target is started, CC IP data packets are received via the X3 interface. The target identification TID and the address information of the CC IP data packets are read by the LIMS. The address information may either be the target's source-IP-address or destination-IP-address. This means
- S220: —Creating a specific key, key1, using the read identification and the address information being the source-IP-address associated to the target. The key is created by means of a key function Key=KeyFunction (TID, source-IP-address), wherein the Targets Identity and source-IP-address is used for creating the key1.
- S230 and S235: —Identifying the session-specific CIN by means of the specific key as memory address in the dedicated data storage. The created key is used for finding the session's specific CIN in the memory storage.

If the key is found, in test S235, than following step S240 is performed:

- S240: —Inserting the identified session-specific CIN in a HI3 message if a match of the key, key1, is found in the dedicated data storage. When the session-specific CIN has been found by means of the created key, key1, the session-specific CIN is inserted in the HI3 message.

If the key is not found and identified (test S235) in the dedicated data storage, following steps are performed:

- S250: —Creating a second specific key, key2, using the read identification and the address information being the destination-IP-address associated to the target. The key function Key=KeyFunction(TID, destination-IP-address) wherein the Targets IDentity and destination-IP-address is used for creating the new key, key2.
- S260: —Identifying the session-specific CIN by means of the second key, key2, as memory address in the dedicated data storage. The new created key is used for finding the session's specific CIN in the memory storage.
- S270: —Inserting the identified session-specific CIN in a HI3 message if a match of the second key, key2, is found in the dedicated data storage.

The above described methods S100 and S200 are preferably used in a fixed broadband system. In the following, a device is described for implementing such a method.

Figure 7:
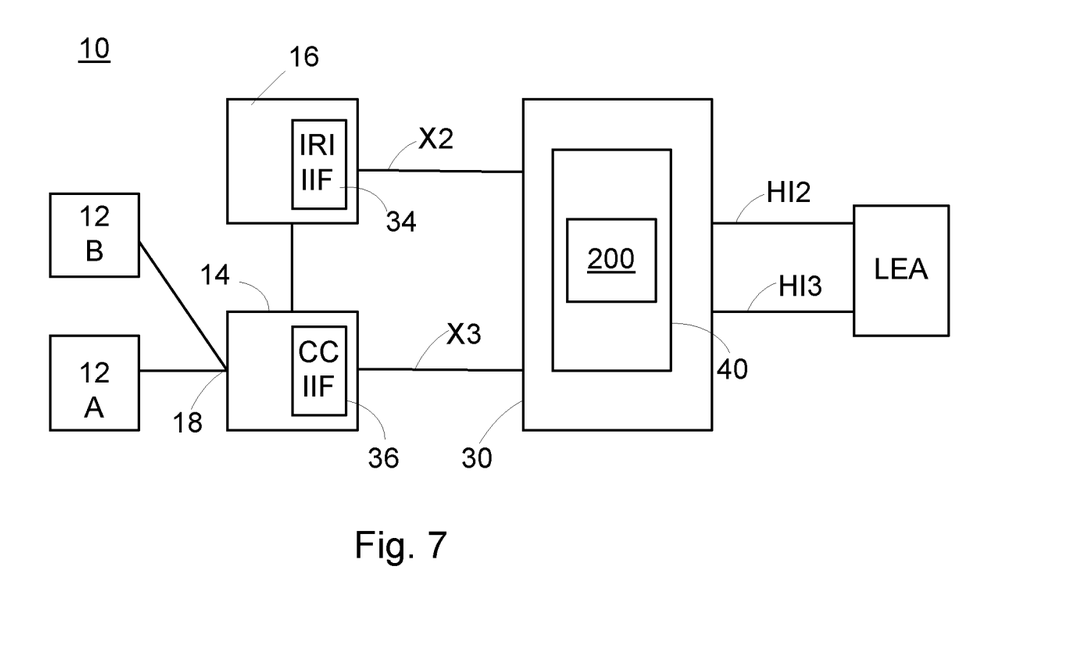
FIG. 7 is a block diagram illustrating a Lawful Intercept System comprising a device 200 for correlation of IRI and CC data.

FIG. 7 is a block diagram illustrating a Lawful Intercept System comprising a device 200 for correlation of IRI and CC data.

The LI system shall provide access to the intercepted Content Communications, CC, and Intercept Related Information, IRI, of target 12A and 12B connected to a Network Access Server and services related to the target on behalf of one or more Law Enforcement Agencies, LEAs. The IRI-IIF, 34 sends IRI raw data via an interface X2 to a Mediation Function of IRI and Delivery Function for IRI reporting of the LIMF 40 of an IMDU 30 that generates and delivers to a collection functionality a standardized IRI report based on the received IRI report. Said standardized IRI report is sent over a standardized interface HI2 to the LEA. The CC-IIF sends CC raw data via an interface X3 to a Mediation Function of IRI and Delivery Function for CC reporting of the LIMF 40 of an IMDU 30 that generates and delivers to a collection functionality a standardized CC report based on the received CC report. Said standardized CC report is sent over a standardized interface HI3 to the requesting LEA.

The object of the device 200 is to correlate received Intercept Related Information, IRI, and, Communications Content, CC, data packets of a target's lawfully intercepted session for deliverance over HI2 and HI3 interfaces, respectively. The device 200 comprises the mediation function and it is configured to detect the target nature, NAS-dependent or not, based on the target type itself. Please note that target types are RADIUS Attributes defined in RADIUS RFC's and thus, for their nature, they have static or dynamic characteristics.

The correlation is performed by means of a session-specific Correlation Identification Number, CIN, that is inserted in the messages delivering received Intercept Related Information, IRI, and, Communications Content, CC, data packets of a target's lawfully intercepted session for deliverance over HI2 and HI3 interfaces, respectively.

Figure 8:
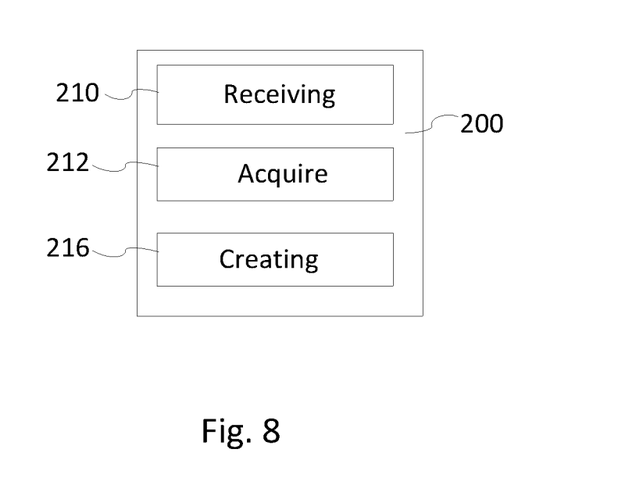
FIG. 8 is a block diagram illustrating a device in Lawful Intercept Mediation System.

FIG. 8 is a block diagram illustrating a device in Lawful Intercept Mediation System.

The device 200 comprises a receiver 210 configured to receive an accounting server message of a first kind or a second kind.

The device 200 further comprises a data extractor 212 which is configured to acquire by reading identification and address information from the received message identification and address information.

The device 200 comprises a processor 216 is configured to, if the accounting server message is of the first kind, create a session-specific CIN using said acquired identification, a session ID and address information and create a key using said acquired identification and address.

In addition, the device 200 may comprise a detector 214 configured to detect which kind of the received accounting server message it is for determining whether a session-specific CIN should be created and stored in a dedicated data storage or removed from the dedicated data storage 220.

Figure 9:
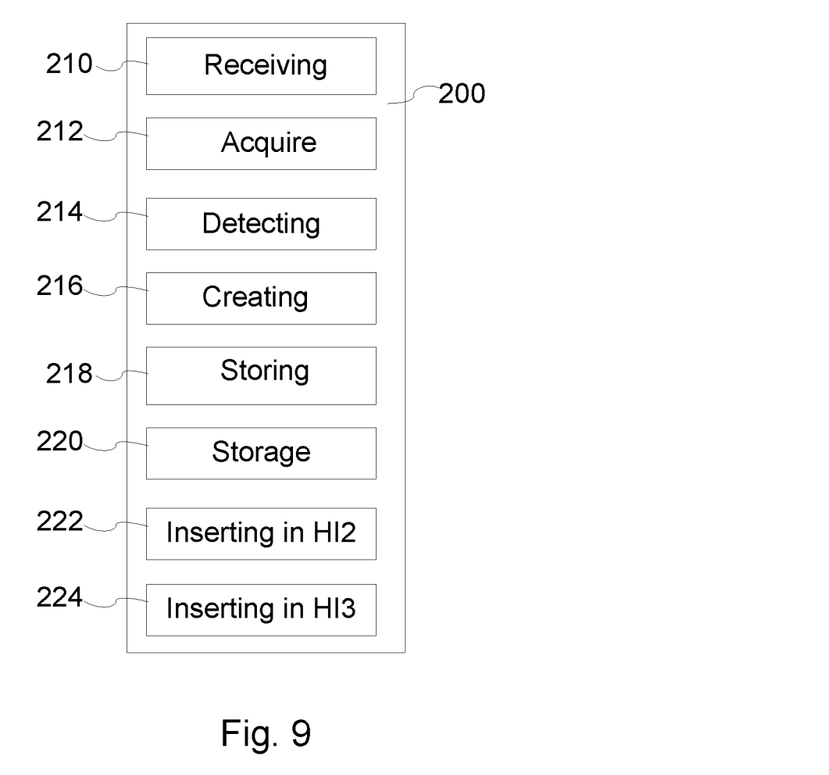
FIG. 9 is a block diagram illustrating an embodiment of the device in Lawful Intercept Mediation System.

FIG. 9 is a block diagram illustrating an embodiment of the device in Lawful Intercept Mediation System.

The device 200 comprises a receiver 210 configured to receive an accounting server message of a first kind or a second kind.

The device 200 further comprises a data extractor 212 which is configured to acquire by reading identification and address information from the received message identification and address information.

In addition, the device 200 comprises a detector 214 configured to detect which kind of the received accounting server message for determining whether a session-specific CIN should be stored in a dedicated data storage or removed from the dedicated data storage 220.

The device 200 comprises a processor 216 is configured to, if the accounting server message is of the first kind, create a session-specific CIN using said acquired identification, a session ID and address information and create a key using said acquired identification and address.

A data storage controller 218 of the device 200 is configured to storing the session-specific CIN with the corresponding key as memory address in the dedicated data storage, said session-CIN being inserted in HI2 and HI3 messages for correlating IRI and CC packets, respectively, corresponding to a target's session.

A HI2 message generator 222 is configured to insert the session-specific CIN in a HI2 message corresponding to the received accounting server message of the first kind.

If the accounting server message is of the second kind, the processor 216 is configured to create a key using said acquired identification and address information. In this case, the data storage controller 218 is configured to locate by means of the key corresponding session-specific CIN in the dedicated data storage, and the HI2 message generator 222 is configured to insert the session-specific CIN in a HI2 message corresponding to the received accounting server message of the second kind. The data storage controller 218 is configured to remove the session-specific CIN by means of the key as memory address in the dedicated data storage, if the accounting server message is of the second kind.

The device 200 may further be adapted to receive CC packets of a target's lawfully intercepted session are received over an X3 interface by the receiver 210.

The data extractor 212 being configured to read target identification and address information of CC data packets of a target's lawfully intercepted session received over the X3 interface. The processor 216 being configured to create a specific key, key1, using the read identification and the address information being the source-IP-address associated to the target. The data storage controller 218 is configured to identify the session-specific CIN by means of the specific key as memory address in the dedicated data storage. A HI3 message generator 224 is configured to insert the identified session-specific CIN in a HI3 message if a match of the key, key1, is found in the dedicated data storage and if the first key is not found. The processor 216 is configured to create a second specific key, key2, using the read identification and the address information being the destination-IP-address associated to the target, and the data storage controller 218 is configured to identify the session-specific CIN by means of the second key, key2, as memory address in the dedicated data storage 220. The HI3 message generator 224 is configured to insert the identified session-specific CIN in a HI3 message if a match of the second key, key2, is found in the dedicated data storage 220.

The methods S100 and S200 may be implemented in digital electronically circuitry, or in computer hardware, firmware, software, or in combinations of them. The device 200 may be implemented in a computer program product tangibly embodied in a machine readable storage device for execution by a programmable processor; and method steps of the invention may be performed by a programmable processor executing a program of instructions to perform functions of the invention by operating on input data and generating output.

The methods S100 and S200, and the device 200 may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 10:
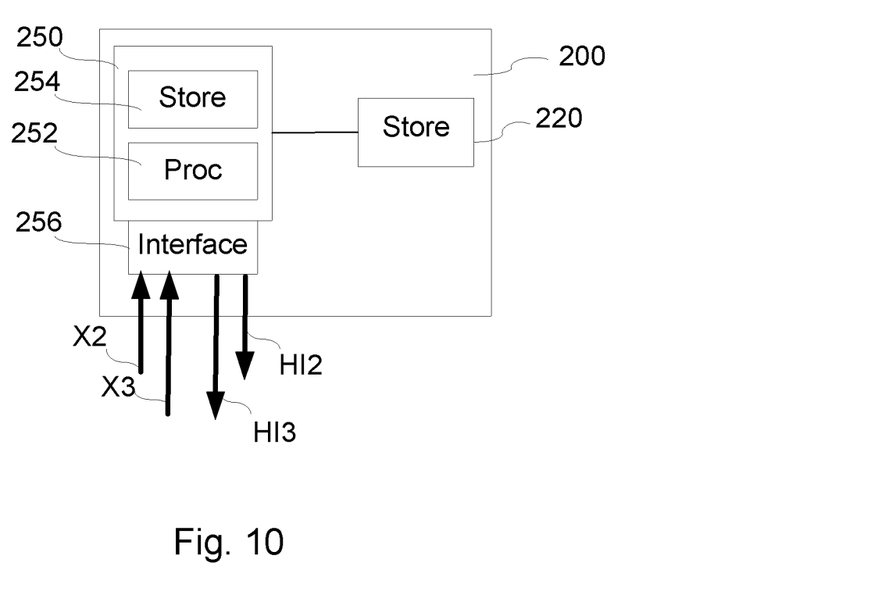
FIG. 10 is a block diagram illustrating another embodiment of a device in Lawful Intercept Mediation System.

FIG. 10 is a block diagram illustrating an embodiment of a device in Lawful Intercept Mediation System.

The device 200 for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a session-specific Correlation Identification Number, CIN. The device comprises a processor 252 in a processing circuitry 250 being operative to perform the steps of the methods S100 and S200.

The device comprises a processing circuitry 250, which comprises a processor 252 and a memory storage 254 for storing computer program instructions as code and data for enabling the processing of the incoming data. Said processing circuitry 250 may also be used for implementing a Delivery Function DF2 and DF3. The processor 252 will receive instructions and data from the memory storage 254 implemented by a read-only memory and/or a random access memory. Storage devices suitable for tangibly embodying computer program instructions and data include all forms of non-volatile memory. Further, a memory storage 220, e.g. a Cache memory, is connected to the processing circuitry 250 for storing for storing different data information to be used and processed in the methods S100 and S200.

The processing circuitry 250 is capable of communicating with LEAs via interface 256, which is adapted to communicate with IAPs via interfaces X2 and X3, and with the LEAs via interfaces HI2 and HI3. The processor 252 is preferably a programmable processor.

A number of embodiments of the present invention have been described. It will be understood that various modifications may be made without departing from the scope of the invention. Therefore, other implementations are within the scope of the following claims defining the invention.

ABBREVIATION

AAA Authentication, authorization, accounting
CC Call Content or Communications Content
CC-IIF CC Internal Interception Function
CCTF CC Trigger Function
CIN Correlation Identity Number
CSP Customer Service Provider
ETSI TS European Telecommunications Standards Institute Technical Specification
IRI Intercept Related Information
IRI-IIF Internal Interception Function
ISP Internet Service Provider
LEA Law enforcement agency
LI Lawful Interception
LIMS LI Management System
MAC Address Media access control address
NAS Network Access Server
NASID NAS Identifier
RADIUS Remote Authentication Dial-In User Service
SIP Session Initiation Protocol
TID Target Identifier
URI Uniform Resource Identifier

The invention claimed is:

1. Method for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a specific Correlation Identification Number, CIN, the method comprises the steps of:

Receiving an accounting server message of a first kind or a second kind;

Acquiring identification, a session ID and address information from the received message;

Creating a session-specific CIN using said acquired identification, the session ID and address information, if the accounting server message is of the first kind.

2. The method according to claim 1, wherein the method further comprises the steps of:

Detecting kind of the received accounting server message for determining whether a session-specific CIN should be stored in a dedicated data storage or removed from the dedicated data storage;

and if the accounting server message is of the first kind:

Creating a key using said acquired identification and address;

Storing the session-specific CIN with the corresponding key as memory address in the dedicated data storage, said session-CIN being inserted in HI2 and HI3 messages for correlating IRI and CC packets, respectively, corresponding to a target's session;

Inserting the session-specific CIN in a HI2 message corresponding to the received accounting server message of the first kind;

or if the accounting server message is of the second kind;

Creating a key using said acquired identification and address information;

Locating by means of the key corresponding session-specific CIN in the dedicated data storage;

Inserting the session-specific CIN in a HI2 message corresponding to the received accounting server message of the second kind;

Removing the session-specific CIN by means of the key as memory address in the dedicated data storage.

3. The method according to claim 1, wherein the accounting server message is an accounting RADIUS message, the first kind being a start message or an interim update message, and the second kind being a stop message.

4. The method according to claim 1, if the received accounting server message is of the first kind, the acquired identification information from the received message is Target Identification Data, TID, and Acct-Sessions-IDentification, and the address information is the Frame-IP-Address, said Frame-IP-Address being associated to the target.

5. The method according to any of the previous claims, further comprising a method wherein CC packets of a target's lawfully intercepted session are received over an X3 interface, the method comprises:

Reading target identification and address information of CC data packets of a target's lawfully intercepted session received over the X3 interface;

Creating a specific key, key 1, using the read identification and the address information being the source-IP-address associated to the target;

Identifying the session-specific CIN by means of the specific key as memory address in the dedicated data storage;

and if the key is found:

Inserting the identified session-specific CIN in a HI3 message if a match of the key, key1, is found in the dedicated data storage;

and if the first key is not found:

Creating a second specific key, key2, using the read identification and the address information being the destination-IP-address associated to the target;

Identifying the session-specific CIN by means of the second key, key2, as memory address in the dedicated data storage;

Inserting the identified session-specific CIN in a HI3 message if a match of the second key, key2, is found in the dedicated data storage.

6. The method according to claim 5, wherein the specific first key, key1, and the specific second key, key2, is created by means of the address information such that key1≠key2.

7. Device for correlating in a Lawful Intercept Mediation system, LIMS, received Intercept Related Information, IRI, and, Communications Content, CC, data packets of a target's lawfully intercepted session for deliverance over HI2 and HI3 interfaces, respectively, by means of a session-specific Correlation Identification Number, CIN, the device comprising a processor in a processing circuitry being operative to perform the steps of claim 1.

8. Device for correlating in a Lawful Intercept Mediation system, LIMS, received Intercept Related Information, IRI, and, Communications Content, CC, data packets of a target's lawfully intercepted session for deliverance over HI2 and HI1 interfaces, respectively, by means of a specific Correlation Identification Number, CIN, the device comprises a receiver configured to receive an accounting server message of a first kind or a second kind, a data extractor configured to acquire identification, a session ID and address information from the received message identification and address information, and a processor being configured to, if the accounting server message is of the first kind, create a session-specific CIN using said acquired identification, the session ID and address information.

9. The device according to claim 8, wherein the device further comprises a receiver configured to receive an accounting server message of a first kind or a second kind, a data extractor configured to acquire identification and address information from the received message identification and address information, a detector configured to detect which kind of the received accounting server message for determining whether a session-specific CIN should be stored in a dedicated data storage or removed from the dedicated data storage, and a processor being configured to, if the accounting server message is of the first kind, create a session-specific CIN using said acquired identification, a session ID and address information and create a key using said acquired identification and address, a data storage controller configured to store the session-specific CIN with the corresponding key as memory address in the dedicated data storage, said session-CIN being inserted in HI2 and HI3 messages for correlating IRI and CC packets, respectively, corresponding to a target's session; and a HI2 message generator configured to insert the session-specific CIN in a HI2 message corresponding to the received accounting server message of the first kind, and if the accounting server message is of the second kind, the processor being configured to create a key using said acquired identification and address information, the data storage controller being configured to locate by means of the key corresponding session-specific CIN in the dedicated data storage, the HI2 message generator being configured to insert the session-specific CIN in a HI2 message corresponding to the received accounting server message of the second kind, wherein data storage controller is configured remove the session-specific CIN by means of the key as memory address in the dedicated data storage.

10. The device according to claim 8, wherein the accounting server message is an accounting RADIUS message, the first kind being a start message or an interim update message, and the second kind being a stop message.

11. The device according to claim 8, if the received accounting server message is of the first kind, the acquired identification information from the received message is Target Identification Data, TID, and Acct-Sessions-IDentification, and the address information is the Frame-IP-Address, said Frame-IP-Address being associated to the target.

12. The device according to claim 8, wherein CC packets of a target's lawfully intercepted session are received over an X3 interface by the receiver, the data extractor being configured to read target identification and address information of CC data packets of a target's lawfully intercepted session received over the X3 interface;

the processor being configured to create a specific key, key1, using the read identification and the address information being the source-IP-address associated to the target;

the data storage controller being configured to identify the session-specific CIN by means of the specific key as memory address in the dedicated data storage;

a HI3 message generator being configured to insert the identified session-specific CIN in a HI3 message if a match of the key, key 1, is found in the dedicated data storage and if the first key is not found, the processor is configured to create a second specific key, key2, using the read identification and the address information being the destination-IP-address associated to the target;

and the data storage controller is configured to Identify the session-specific CIN by means of the second key, key2, as memory address in the dedicated data storage, and the HI3 message generator is configured to insert the identified session-specific CIN in a HI3 message if a match of the second key, key2, is found in the dedicated data storage.

13. The device according to claim 12, wherein the specific first key, key1, and the specific second key, key2, is created by means of the address information such that $key1 \neq key2$.

* * * * *